United States Patent
Faglioni

[11] 3,803,446
[45] Apr. 9, 1974

[54] STABILIZING NETWORK FOR CRT HIGH-VOLTAGE POWER SUPPLY

[75] Inventor: Auro Faglioni, Caronno Bertusella, Italy

[73] Assignee: Ates Componenti Eletronici S.p.A., Milan, Italy

[22] Filed: Dec. 20, 1971

[21] Appl. No.: 210,071

[30] Foreign Application Priority Data
Dec. 22, 1970 Italy.................................. 33424/70

[52] U.S. Cl. ........................... 315/27 SR, 178/7.3 R
[51] Int. Cl. ............................................. H01j 29/70
[58] Field of Search ....... 315/27 TD, 27 SR, 28, 29; 323/DIG. 1, 76; 178/7.3 R

[56] References Cited
UNITED STATES PATENTS

| | | | |
|---|---|---|---|
| 3,594,499 | 7/1971 | Sansone | 323/DIG. 1 |
| 3,500,116 | 3/1970 | Rietveld | 315/27 TD |
| 3,428,856 | 2/1969 | Jones | 315/27 R |

*Primary Examiner*—Maynard R. Wilbur
*Assistant Examiner*—J. M. Potenza
*Attorney, Agent, or Firm*—Karl F. Ross; Herbert Dubno

[57] ABSTRACT

A high d-c voltage for the operation of a television picture tube is derived from the rectified output voltage of a transformer developed across a secondary winding thereof, this transformer having a primary winding periodically energized by the flyback stroke of an associated horizontal-sweep circuit. A part of the flyback current also passes an ancillary transformer winding in series with a resonant network normally tuned to the fifth harmonic of the fundamental frequency of the flyback pulse to level the output voltage as long as the transformer secondary is substantially open-circuited, i.e., in the absence of anode current generated by the beam; this secondary is connected to the input of a transistor generating a biasing current through a control winding electromagnetically coupled with the inductance of the resonant network so as to detune same in the presence of a substantial anode current, thereby increasing the primary current of the transformer to compensate for the added drain upon the high-voltage transformer output.

7 Claims, 5 Drawing Figures

STABILIZING NETWORK FOR CRT HIGH-VOLTAGE POWER SUPPLY

My present invention relates to a stabilizing network for a high-voltage power supply designed to energize an accelerating electrode of a cathode-ray tube, particularly in a television receiver.

In commonly owned U.S. Pat. Nos. 3,594,499 and 3,629,497, as well as application Ser. No. 845,709 filed 29 July 1969 by Eugenio Cavallari, now U.S. Pat. No. 3,641,267, there have been disclosed various systems for generating two d-c voltages, i.e., a high positive voltage for an accelerating anode and a substantially lower positive voltage for the operation of associated circuitry, with the aid of a coupling transformer whose primary winding receives a rectified supply voltage from an a-c utility outlet by way of a chopping transistor which is alternately blocked and unblocked by a feedback voltage from a secondary winding of that transformer. The output current of the chopping transistor is smoothed by a filter circuit, which includes the primary winding of the transformer, and is delivered to a sweep circuit for charging a storage capacitor connected across a horizontal-deflection coil or yoke of the cathode-ray tube. A sawtooth wave including a recurrent flyback stroke is generated by the periodic application of synchronizing signals, in the form of rectangular pulses, to a transistor in the sweep circuit acting as an electronic switch for the discharge of the storage capacitor. A generally rectangular pulse, which substantially coincides with the flyback stroke and whose duration is a small fraction of its recurrence period, is transmitted through the transformer to the chopping transistor to unblock same for a short period, thereby producing a pulsating unipolar current in a d-c path leading from the chopper to the storage capacitor in the sweep circuit. This pulsating current gives rise to the lower d-c voltage upon integration in a circuit which includes the transformer primary as a reactance.

The amount of energy stored in the capacitor during each sweep cycle is partly determined by the current delivered to the other loads, including the accelerating anode, by the coupling transformer. This energy, and consequently the magnitude of the beam-deflecting current, depends therefore upon the intensity of the beam itself which in a state of high brightness draws considerable current from the accelerating anode. A brightening of the beam, accordingly, amy lead to an appreciable shrinking of the television picture in both dimensions since, as a rule, the vertical-sweep circuit is also energized by the low-voltage transformer output.

It is, therefore, the general object of my invention to provide an improved high-voltage power supply for the purpose set forth in which this objectionable correlation between brightness and frame size is avoided.

In accordance with the present invention, the above object is realized by the provision of a resonant circuit (preferably a parallel-resonant one) in a current path which includes an ancillary winding of the coupling transformer and lies between the storage capacitor or equivalent energy-storing means of the sweep circuit and the associated direct-current source, this circuit being tuned to a harmonic of the fundamental frequency of the generally rectangular flyback pulse. The relative polarization of the transformer primary and this ancillary winding is such that the combined energy of the two windings during the flyback stroke is substantially constant, thereby resulting in an approximately flat output voltage across the high-voltage secondary winding which feeds the accelerating electrode. A feedback circuit, extending from that secondary winding, automatically adjusts a variable reactance of the resonant circuit in response to the flow of anode current in the secondary winding to increase the transformer input in the presence of such current.

In an advantageous embodiment, the tuned circuit lies in series with the ancillary winding and is of the parallel-resonant type, resonating at an odd higher harmonic (preferably the 5th harmonic) of the fundamental frequency of the flyback pulse. With the primary and ancillary windings connected in aiding relationship, and with suitable adjustment of the circuit parameters, the output voltage delivered by the secondary winding during the flyback stroke may be a substantially flat pulse in the absence of appreciable anode-current flow, i.e., as long as the beam of the cathode-ray tube is substantially suppressed. Upon a brightening of the beam, the detuning of the parallel-resonant circuit reduces its series impedance and enables more current to reach the ancillary winding, thereby increasing the amount of input energy and consequently the output voltage of the transformer.

The adjustable reactance of the resonant circuit could be either capacitive (such as varactor) or inductive. In the preferred system described in detail hereinafter, I use as the inductive branch of the circuit (or as part of that branch) a coil with a saturable core carrying a biasing winding in series with a transistor whose input circuit is connected to the secondary winding of the coupling transformer. Thus, the flow of anode current in that secondary winding alters the conductivity of the transistor and, with it, the magnetization of the inductance core with resulting detuning of the resonant circuit.

The above and other features of my invention will be described in detail hereinafter with reference to the accompanying drawing in which.

Reference will first be made to FIG. 1 which shows the present improvement as applied to a supply network of the general type disclosed in the commonly owned application and patents identified above. For convenience, similar reference numerals have been used for analogous components.

Figure 1:
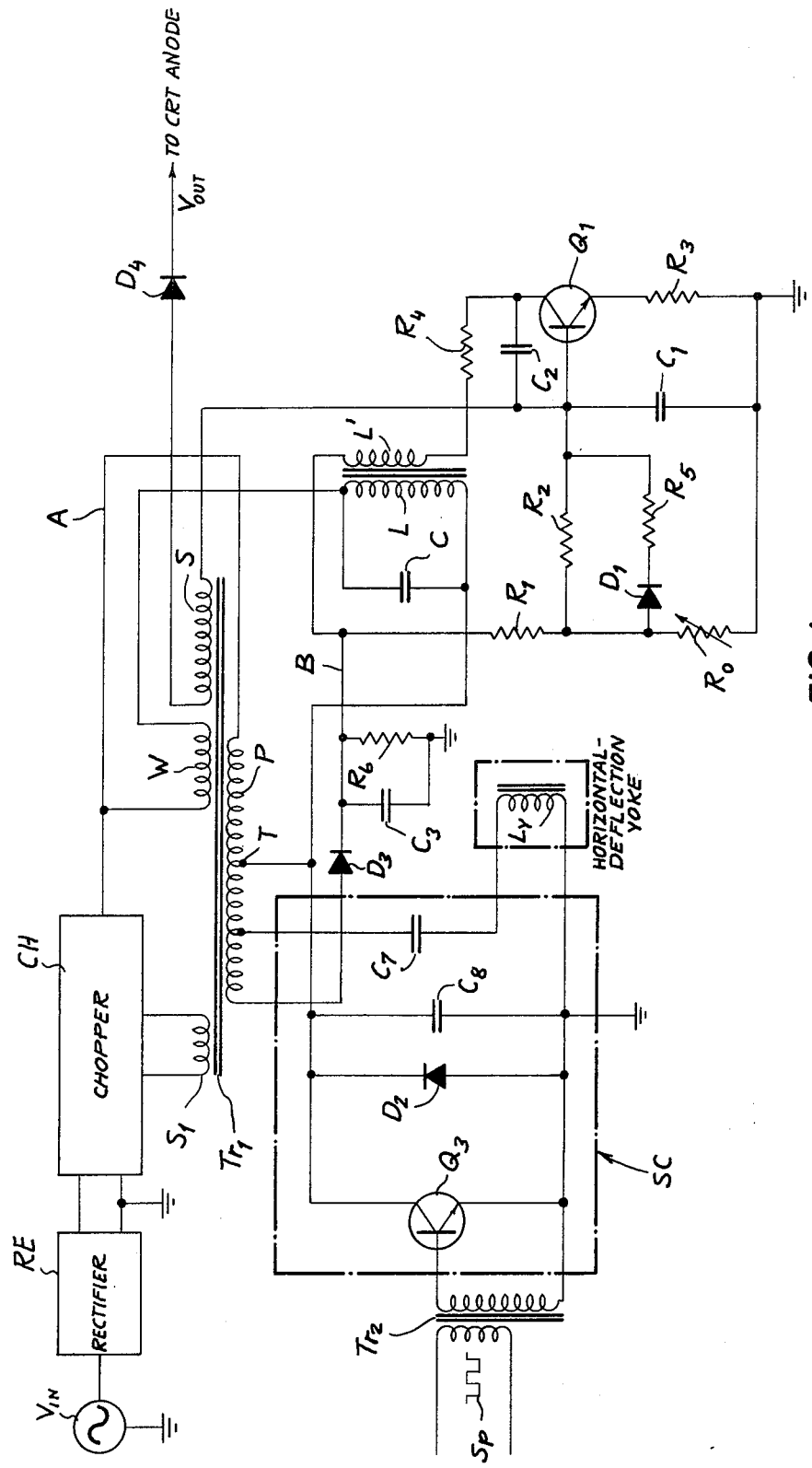
FIG. 1 is a circuit diagram of a power-supply network embodying the present invention.

The system comprises a source of direct current which includes an a-c supply $V_{in}$ (e.g. a utility outlet of 220 V RMS) working into a rectifier stage RE which feeds a chopper CH having an output lead A. Chopper CH unblocks the current flow from circuit RE to lead A during short periods coinciding with the flyback stroke of the horizontal sweep of a cathode-ray tube (not shown) whose beam is accelerated by an anode energized through the network of FIG. 1. A coupling transformer $Tr_1$ has a primary winding P connected to lead A, a secondary winding S feeding the accelerating anode through a rectifier (schematically represented by a diode $D_4$) and a nonillustrated smoothing circuit, and another secondary $S_1$ controlling a transistor or a pair of cascaded transistors (not shown) in chopper CH.

An ancillary winding W on the core of transformer $Tr_1$ is connected, in series with a parallel-resonant circuit L,C, between lead A and a tap T of transformer primary P, the latter operating as an autotransformer with some of its turns connected across a sweep circuit SC for the horizontal beam deflection. This sweep circuit, in a manner fully described in the above-identified application and patents, energizes a deflecting yoke $L_y$ which together with a series condenser $C_7$ is shunted by a storage capacitor $C_8$ and by a diode $D_2$ in parallel therewith. The periodic charging and discharging of capacitor $C_8$, and with it the energization of coil $L_y$ by a sawtooth current, is controlled by a shunt transistor $Q_3$ receiving a train of synchronizing pulses $sp$ through a transformer $Tr_2$.

Figure 2:
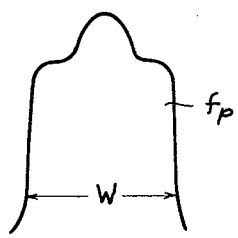
FIGS. 2, 3 and 4 are graphs showing different wave shapes in the system of FIG. 1.
Figure 3:
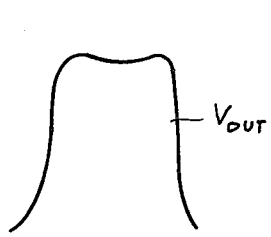

The circuitry so far described generates in primary P a recurrent flyback pulse $fp$ of generally rectangular shape, FIG. 2, whose width $w$ is a small fraction of its recurrence period. This pulse is seen to have a distinct central peak which, however, is substantially flattened or even slightly reversed in the output voltage $V_{out}$ (FIG. 3) by the aiding energization of transformer $Tr_1$ through winding W. It is assumed that the resonant circuit C,L is tuned to the 5th harmonic of the fundamental frequency $\frac{1}{2}w$ of the flyback pulse $fp$; this results in a compensatory wave shape in the current of winding W which, when superimposed upon the wave shape of FIG. 2, gives rise to the nearly flat output voltage of FIG. 3.

In accordance with an important feature of my invention, I make the tuning of resonant circuit L,C adjustable by winding its inductance L on a saturable core together with a biasing winding L' which is connected between a positive bus bar B and ground in series with two resistors $R_3$, $R_4$ and a transistor $Q_1$. The base of this transistor is biased by means of a voltage divider connected between bus bar B and ground, the voltage divider comprising an adjustable resistor $R_0$ in series with a fixed resistor $R_1$. The junction of these two resistors is connected to the transistor base through an integrating circuit indluding a series resistor $R_2$ in parallel with the series combination of a diode $D_1$ and a resistor $R_5$. A shunt condenser $C_2$, designed to eliminate residual a-c components of line voltage $V_{in}$ on lead A, is connected across the base and collector of transistor $Q_1$.

By suitable adjustment of variable resistor $R_0$, transistor $Q_1$ is so biased that circuit L,C is tuned to the desired harmonic as long as secondary S draws substantially no current, i.e., as long as the base potential of transistor $Q_1$ is relatively positive to keep this transistor turned on.

Figure 4:
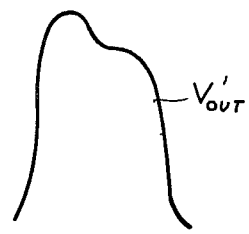

When the beam of the cathode-ray tube is brightened, the flow of secondary current drives the base of transistor $Q_1$ negative to cut off conduction through biasing winding L'. This operation alters the effective inductance of coil L and therefore detunes the circuit C,L to reduce its series impedance so as to increase the current flow through ancillary wnding W. In FIG. 4 I have shown a curve $V_{out}'$ which represents the output voltage developed across secondary S in this detuned condition.

Resistor $R_4$, which may have a magnitude on the order of 1 KΩ, serves to increase the Q value of resonant circuit L,C. Diode $D_1$ and resistor $R_5$ help maintain a substantially cophasal relationship between the anode current and the output voltage $V_{out}$.

Bus bar is shown to be energized from a terminal of primary P by way of a smoothing circuit including a diode $D_3$, a capacitor $C_3$ and a resistor $R_6$. This bus bar may also supply a relatively low d-c voltage for energizing a vertical sweep circuit, the generator of synchronizing pulses $sp$ and other equipment in the audio or video channels of the television receiver containing the aforementioned cathode-ray tube.

Figure 5:
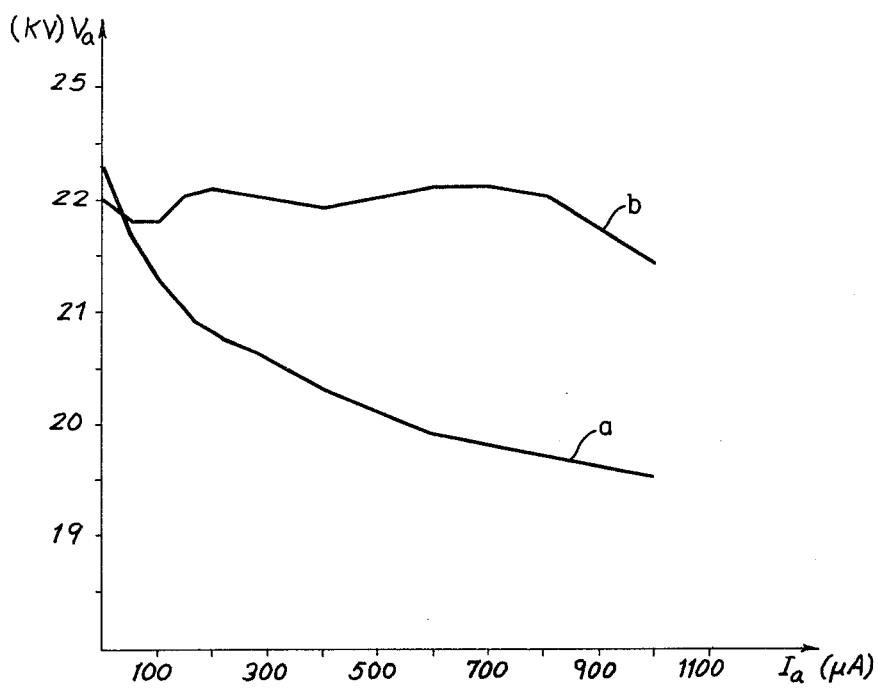
FIG. 5 is a curve diagram showing the correlation between anode current and d-c output voltage in a system with or without the present improvement.

In FIG. 5 I have shown two curves $a$ and $b$ representing the integrated anode voltage $V_a$ (in kilovolts) plotted against anode current $I_a$ (in microamps) for a system without feedback circuit $Q_1$, L' (curve $a$) and for one with that circuit (curve $b$). It will be noted that the anode voltage remains substantially stable over a wide range of anode currents, up to about 1 milliamp, corresponding to beam intensities between zero and maximum brightness.

I claim:

1. A network for delivering a continuous output voltage to an accelerating electrode of a cathode-ray tube provided with a sweep circuit including beam-deflecting means, said network comprising:

energy-storing means in said sweep circuit connected to said beam-deflecting means;

a source of unipolar current connected via a d-c path to said energy-storing means for progressively charging same to energize said beam-deflecting means;

electronic switch means in said sweep circuit connected to receive a train of synchronizing signals for periodically discharging said energy-storing means, thereby generating in said beam-deflecting means a sawtooth wave including a recurrent flyback stroke of a duration representing a small fraction of its recurrence period;

transformer means including a primary winding, a secondary winding and an ancillary winding electromagnetically coupled to one another, said primary winding being connected to said energy-storing means for periodic energization by a succession of generally rectangular pulses coinciding with said flyback stroke, said secondary winding being connected to said accelerating electrode, said ancillary winding being inserted in a branch of said d-c path;

a resonant circuit in said branch including a coil provided with a saturable core for normally maintaining said resonant circuit substantially tuned to a harmonic of the fundamental frequency of said generally rectangular pulses, thereby substantially flattening an output voltage generated in said secondary winding during said flyback stroke; and feedback means in circuit with said secondary winding including a biasing winding on said core and a transistor in series with said biasing winding for detuning said resonant circuit in response to a substantial current flow through said secondary winding to said accelerating electrode, said transistor having an input circuit connected to said secondary winding.

2. A network as defined in claim 1 wherein said harmonic is a higher odd harmonic.

3. A network as defined in claim 1 wherein said input circuit includes a variable resistor for modifying the shape of said output voltage.

4. A network as defined in claim 1 wherein said input circuit includes voltage-integrating impedance means.

5. A network as defined in claim 1 wherein said resonant circuit is a parallel-resonant circuit in series with said ancillary winding.

6. A network as defined in claim 1 wherein said source comprises a d-c supply and chopper means in series with said supply connected to be driven by said transformer means for establishing a connection from said supply to said path only during periods substantially coinciding with said flyback stroke.

7. A network as defined in claim 1 wherein said path includes a portion of said primary winding.

* * * * *